(12) United States Patent
Yamada

(10) Patent No.: US 6,554,475 B2
(45) Date of Patent: Apr. 29, 2003

(54) HYDRODYNAMIC BEARING UNIT

(75) Inventor: Tsuneo Yamada, Mie-ken (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/988,025

(22) Filed: Nov. 16, 2001

(65) Prior Publication Data
US 2002/0064324 A1 May 30, 2002

(30) Foreign Application Priority Data
Nov. 28, 2000 (JP) ........................................ 2000-361254

(51) Int. Cl.[7] ............................................... F16C 32/06
(52) U.S. Cl. ..................................................... 384/107
(58) Field of Search ................................. 384/107, 112, 384/123, 121

(56) References Cited

U.S. PATENT DOCUMENTS 6,361,214 B1 * 3/2002 Ichiyama .................... 384/107
6,390,681 B1 * 5/2002 Nakazeki et al. ........... 384/107

FOREIGN PATENT DOCUMENTS

JP          2001099141 A  *  4/2001

* cited by examiner

Primary Examiner—Thomas R. Hannon
(74) Attorney, Agent, or Firm—Arent Fox Kintner Plotkin & Kahn

(57) ABSTRACT

A hydrodynamic bearing unit is provided, which can greatly reduce costs, while achieving high accuracy of squareness between a shaft portion and a flange portion which constituting a shaft member formed in one piece by forging. A recess portion is provided at a corner portion between the shaft portion and the flange portion, in which the recess potion is constituted with a first recess portion formed by forging at an end face of the flange portion and a second recess portion formed by rolling at an outside periphery of the shaft portion.

4 Claims, 4 Drawing Sheets

HYDRODYNAMIC BEARING UNIT

BACKGROUND OF THE INVENTION

1. Field of the Invention

The invention relates to a hydrodynamic bearing unit supporting without contact a shaft member (or a spindle) by hydrodynamic pressure generated in a bearing clearance. More particularly, the invention relates to a bearing unit suitable for supporting spindles of spindle motors for information-processing equipment. The "spindle motors in information-processing equipment" used herein includes, for example, a spindle motor for driving an optical disk such as CD-R/RWs and DVD-ROM/RAMs, a magneto-optical disk such as MOs, a magnetic disk such as HDDs, a polygon scanner motor employed in a laser beam printers (LBP) or a copying machine, and the like.

2. Description of the Related Art

Conventionally, roller bearings have been commonly used as bearings for supporting spindles of spindle motors for information-processing equipment typified by magnetic disk drives. In recent years, however, roller bearings have been increasingly replaced by hydrodynamic bearings that have excellent characteristics such as high rotational accuracy, high damping, and low noise. A hydrodynamic bearing known (such as Japanese Patent Laid-Open Publication No. Hei. 12-220633, for example) as this kind is such that a shaft member serving as a spindle is supported in radial and thrust directions without contact by generating dynamic pressure in both of clearances, namely, in a radial bearing clearance of a radial bearing portion and in a thrust bearing clearance in a thrust bearing portion.

FIG. 4 shows a known constitution of such a shaft member for the bearing unit where, as described above, both a radial bearing portion and a thrust bearing portion are constituted by hydrodynamic bearings. The shaft member is composed of a shaft portion 21 and a disk-like flange portion 22 which is pressed in and fixed to a shaft end of the shaft portion 21.

In this constitution, however, it is difficult to always obtain highly accurate squareness between the shaft portion 21 and the flange portion 22. This is because the shaft portion is press-fitted into the flange portion. Therefore, end faces of the flange 22 and faces opposed to the end faces may contact with each other during operation of the bearing unit, giving possible affection to bearing performance. Measurement of squareness between the shaft portion and the flange portion after assembling is generally difficult, because they have been already assembled into the unit. Even if it is possible, such work involves complex work to cause increased assembling costs.

SUMMARY OF THE INVENTION

Therefore, an object of the present invention is to provide such a hydrodynamic bearing unit that can assure highly accurate squareness between a shaft portion and a flange portion and can be produced at low costs.

Accuracy of squareness between a shaft portion and a flange portion can be improved by forming them in one piece and machining the formed shaft member in one-piece form, while controlling the squareness for a predetermined accuracy. Turning operation is a common machining method for this kind of one-piece type shaft member; however, working by turning consumes long time, sharply increasing working costs.

Further, a surface of the shaft member must be ground for finishing after it has been turned. For this grinding process, a recess portion 24 must be provided at a corner portion 23 between the shaft portion 21 and the flange portion 22 as an enlarged view in FIG. 5 shows. Turning operation is a general working method for forming a portion such as the recess portion 24; however, it is not preferred because it consumes long time for working.

In view of the points described above, a hydrodynamic bearing unit according to the present invention comprises a shaft member having a shaft portion and a flange portion, a radial bearing portion supporting without contact the shaft portion in a radial direction by hydrodynamic pressure generated in a radial bearing clearance, and a thrust bearing portion supporting without contact the flange portion in a thrust direction by hydrodynamic pressure generated in a thrust bearing clearance. The shaft member is formed in one piece by forging, and a recess portion formed by forging or rolling is provided at a corner portion between the shaft portion and the flange portion.

As described above, highly accurate squareness between the shaft portion and the flange portion can be achieved by forming the shaft member in one piece. Further, by forming the recess portions by forging or rolling, working time for the recess portion can be shortened in comparison with the case where the recess portion is made by turning. This, in combination with the fact that the entire shaft member is formed by forging, greatly reduces working costs for the shaft member. In this case, when a recess portion has a special form with an inclination (for example, $\alpha=27.5°$, $\beta=27.5°$, $\theta=35°$, and $R_o=0.1$, as approximate values) as shown in FIG. 5, working by forging or rolling is difficult. Therefore, the recess portion is preferably a non-inclined form without inclination such as a form constituted by a depression portion arranged in an axial direction or a radial direction.

Further, a constitution that can also be taken is such that the shaft member is formed in one piece by forging, and a first recess portion formed by plastically deforming a part of an end face of the flange portion in an axial direction of the shaft member is provided at the end face thereof near an outside periphery of the shaft portion, and at the same time, a second recess portion formed by plastically deforming a part of an outside periphery of the shaft portion in a radial direction of the shaft member is provided at the outside periphery thereof near the end face of the flange portion. In order to form through plastic working the recess portion 24 having an inclined form shown in FIG. 5, a dedicated working device must be developed. However, when the first recess portion and the second recess portion are formed by plastically deforming in axial and radial directions, a working device for general use can be applied, so that a sharp rise in production costs can be prevented.

In this case, the first recess portion may be formed by forging, and the second recess portion by rolling. By doing so, working time can be greatly reduced from the case where the recess portions are formed by turning.

Thus, in this invention, because the entire part of the shaft member including the recess portions is formed by plastic working (forging and rolling), a turning process is eliminated so that working costs can be reduced. Furthermore, forming the shaft member in one piece by forging (and grinding the entire part of the shaft member thereafter) realizes highly accurate finished dimensions (such as squareness), achieving, simultaneously and at high levels, reduced processing costs and increased accuracy.

Thus, high accuracy and reduced costs of a spindle motor for information-processing equipment can be achieved by rotatably supporting a spindle with a hydrodynamic bearing unit having the constitution described above.

The nature, principle, and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Embodiments according to the invention will be described below referring to FIG. 1 to 5.

Figure 1:
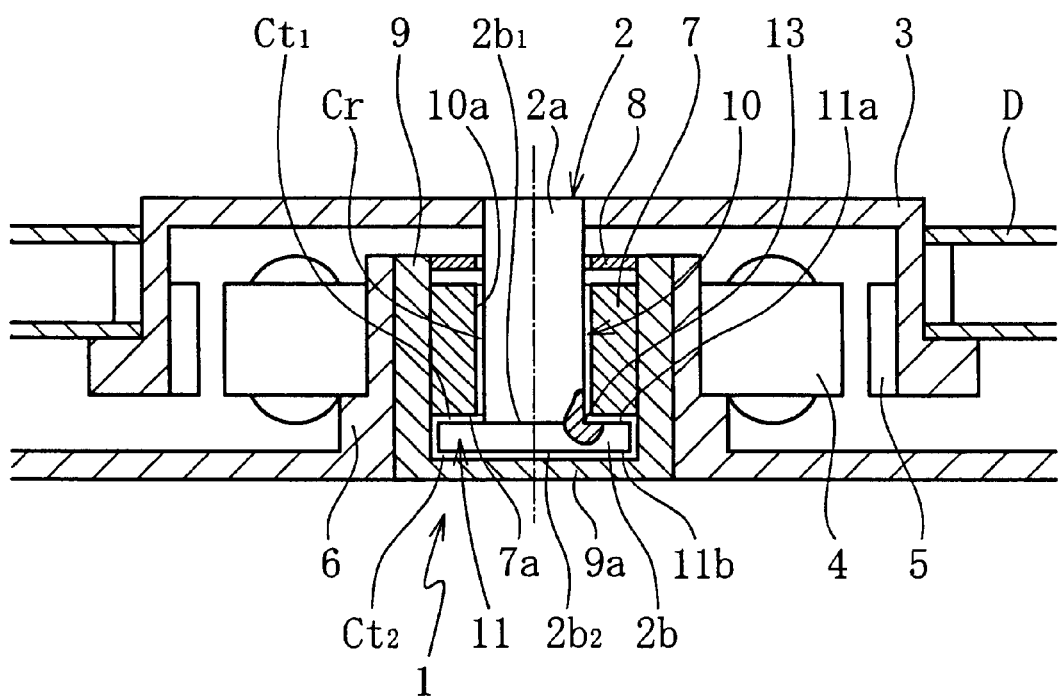
FIG. 1 is a cross sectional view of a hydrodynamic bearing unit according to the invention, taken in an axial direction.

FIG. 1 shows an example of an HDD spindle motor provided with a hydrodynamic bearing unit 1 according to the invention. This spindle motor has the bearing unit 1 rotatably supporting a shaft member 2, a disk hub 3 being installed on the shaft member 2 and retaining one or a plurality of magnetic disks D, and a motor stator 4 and a motor rotor 5 being opposed to each other through radial gaps. The motor stator 4 is installed at an outside periphery of a casing 6 having a hollow cylindrical form retaining the bearing unit 1. The motor rotor 5 is installed on an inside peripheral face of the disk hub 3. When electric current is conducted through the motor stator 4, the motor rotor 5 rotates by magnetic force exerted between the motor stator 4 and the motor rotor 5, and in turn the disk hub 3 and the shaft member 2 rotate.

When the bearing unit 1 is used as a spindle motor for different information-processing equipment, for example, optical disk drives or magneto-optical disk drives, a turntable (not shown) supporting and securing a disk is fixed to the shaft member 2. A polygon mirror (not shown) is fixed to the shaft member 2 when the bearing unit 1 is used for polygon mirror scanner motors of LBPs.

The bearing unit 1 comprises, as main constitutional members and parts, the shaft member 2 having a shaft portion 2a and a flange portion 2b that protrudes toward an outside-diameter side of the shaft portion 2a, a housing 9 of a hollow cylindrical form with a closed bottom similar to the cup shape, a bearing member 7 of a thick-walled hollow cylindrical form fixed to an inside periphery of the housing 9, and a sealing member 8 such as a sealing washer for sealing one end of the bearing member. In the description below, out of axially both sides of the housing 9, a side (or the lower side in the figure) closed with a bottom portion 9a is called a "closed side," and the other side (or the upper side in the figure) is called "non-closed side."

As described above, the shaft member 2 is composed of shaft portion 2a and flange portion 2b which is provided at an end portion of the shaft portion 2a at the closed side. The shaft portion 2a of the shaft member 2 is received inside the bearing member 7, and the flange portion 2b is received between the bearing member 7 and the bottom portion 9a of the housing 9. The bearing member 2 is made of a metal material, preferably of a ferrous material with high hardness such as stainless steel (SUS420, for example) in consideration of the fact that a motor rotor is press-fitted into the bearing portion 2a as described below.

The bearing member 7 is made of a soft metal such as copper or brass. A radial bearing face 10a having a plurality of grooves (or dynamic pressure grooves) for generating hydrodynamic pressure are formed at an inside periphery of the bearing member 7. With this arrangement, when the shaft member 2 and the bearing member 7 relatively rotate (when the shaft portion 2 rotates, in this embodiment) to each other, dynamic pressure of hydraulic fluid (such as lubricant oil), filled in a radial bearing clearance Cr between the radial bearing face 10a and an outside periphery of the shaft portion 2a, is generated to form the radial bearing portion 10 that supports the shaft portion 2a in a radial direction without contact. The bearing member 7 may be made of a sintered metal, in which case an oil-impregnated sintered metal, into which lubricant oil or lubricant grease is impregnated to make the metal contain oil, is used as the bearing member 7 described above. The width of a radial bearing clearance Cr in the figure is exaggeratedly shown (and so are thrust bearing clearances Ct1 and Ct2 described below).

Thrust bearing clearances Ct1 and Ct2, which are clearances in an axial direction, are provided at axially both sides of the flange portion 2b. One of the thrust bearing clearances, or the clearance Ct1, is formed between an end face 2b1 at the non-closed side of the flange portion 2b and an end face 7a, opposed to the end face 2b1, of the bearing member 7. The other clearance, or the thrust bearing clearance Ct2, is formed between an end face 2b2 at the closed side of the flange portion 2b and a bottom portion 9a, opposed to the end face 2b2, of the housing 9. At both the end faces 2b1 and 2b2 of the flange portion 2a are formed thrust bearing faces 11a and 11b, each of which has a plurality of dynamic pressure grooves. With the arrangement described above, when the shaft member 2 rotates, hydraulic fluid such as lubricant filled between the thrust bearing clearances Ct1 and Ct2 generates dynamic pressure, thereby constituting a thrust bearing portion 11 that supports without contact the flange portion 2b from both sides in a thrust direction.

The dynamic pressure grooves of the radial bearing face 10a and the thrust bearing faces 11a and 11b can be made in any shape. They can be selected from any known pattern such as a herringbone type pattern, a spiral type pattern, a stepped type pattern, and a multiple circular-arc type pattern or can be appropriate combinations thereof. In FIG. 1, the radial bearing face 10a is formed at the inside periphery of the bearing member 7; however, it can also be formed at an outside periphery of the shaft portion 2a. Further, the thrust bearing faces 11a and 11b may be formed at an end face 7a of the bearing member 7 opposed to both the end faces 2b1 and 2b2 of the flange portion 2b or may also be formed at an end face of the bottom portion 9a of the housing 9.

The bearing unit 1 described above is assembled in such a way that the shaft member 2 is inserted into the housing 9 with the flange portion 2b being made to face the closed side, and the bearing member 7 is press-fitted into or bonded to a predetermined position on the inside periphery of the housing 9 so that the thrust bearing clearances Ct1 and Ct2 having predetermined widths (approximately from 10 to 20 μm) are formed. Further, the spindle motor shown in FIG. 1 is assembled in such a way that the bearing unit 1 is press-fitted into or bonded to an inside periphery of the casing 6 of a hollow cylindrical form, and an assembly (or motor rotor) comprising components such as the motor rotor 5 and the disk hub 3 is press-fitted into a non-closed side end portion of the shaft portion 2a.

In this invention, the shaft member 2 comprising the shaft portion 2a and the flange portion 2b is formed in one piece by forging. When the shaft member 2 is constituted as one piece, accuracy of squareness of the shaft member 2 after working can be easily improved by controlling squareness between the shaft portion 2a and the flange portion 2b during the working process. Further, because the squareness can be measured before assembling the shaft member 2 into a bearing unit, accuracy measurement and the confirmation of results of the measurement are easily carried out. Forming the shaft member 2 by forging can considerably shorten (to approximately 1/10) working time when compared with the case where it is formed by turning, enabling considerable reduction in production costs.

Figure 2:
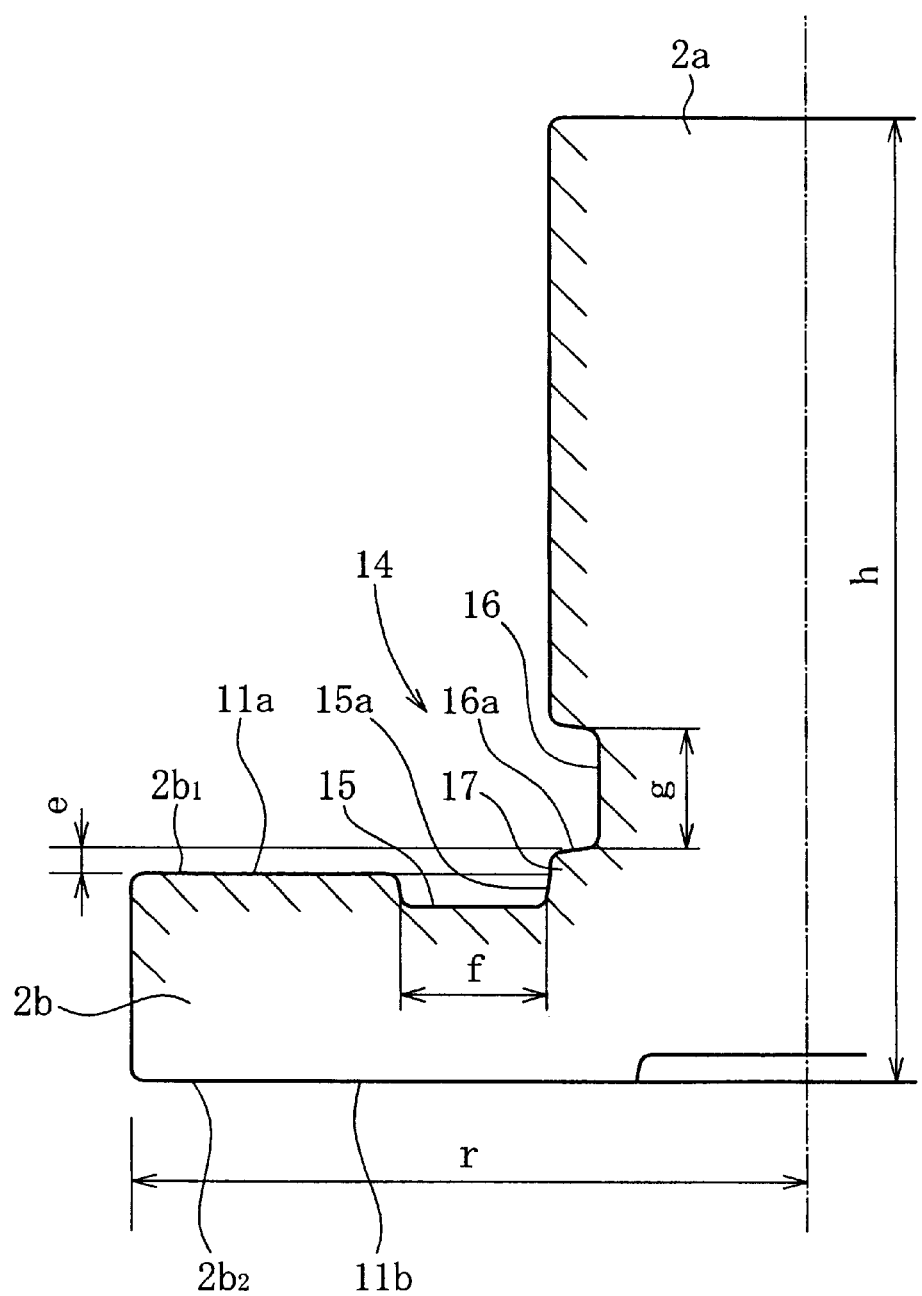
FIG. 2 is an enlarged cross sectional view of a shaft member used for the hydrodynamic bearing unit in FIG. 1.

A surface of the shaft member 2 after forging is finished by grinding. In order to prevent a grind stone from touching or colliding with faces other than those to be worked during the grinding, a recess portion 14 is formed, as shown in FIG. 2, at a corner portion 13 between an outside periphery of the shaft portion 2a and the end face 2b1 at the non-closed side of the flange portion 2b.

The recess portion 14 is constituted by a first recess portion 15 formed at the end face 2b1 at the non-closed side of the flange portion 2b and a second recess portion 16 formed at an outside periphery of the shaft portion 2a. Each of the recess portions 15 and 16 is an annular groove centering about an axis of the shaft member 2. A bottom of each groove is located at a position sunk from the end face 2b1 of the flange portion and an outside peripheral surface of the shaft member 2a, respectively. A part, near the outside periphery of the shaft portion 2a, of the end face 2b1 at the non-closed side of the flange portion 2b is plastically deformed in an axial direction of the shaft member 2 to form the first recess portion 15. Also, a part, near the flange portion end face 2b1, of the outside periphery of the shaft portion 2a is plastically deformed in a radial direction of the shaft member 2 to form the second recess portion 16. The first recess portion 15 can be formed by forging, and the second recess portion 16, by rolling. In this case, the rolling of the second recess portion 16 is made after the forging of the first recess portion 15 has been completed.

In an example shown in the figure, an inside-diameter end portion 15a of the first recess portion 15 is positioned on a line extended from the outside periphery of the shaft portion 2a; however, the inside-diameter end portion 15a may also be positioned at radially more outside-diameter side than the case shown in the figure. Further, in the illustrated example, the end portion 16a at the closed-side of the second recess portion 16 is positioned at a position shifted by a distance e to the non-closed side from the end face 2b1 of the flange portion 2b; however, the end portion 16a at the closed side may also be positioned on a line extended from the flange portion end face 2b1 (e=0). When the distance e is too large, a distance between both the recess portions 15 and 16 is enlarged, making the recess portion 14 difficult to play its function. Therefore, the distance e is preferably 0.5 mm or less (or $0 \leq e \leq 0.5$ mm).

In order to shorten working time, forging of the first recess portion 15 is preferably made at the same time when the entire unit of the shaft member 2 is forged. However, if longer working time involves fewer problems, the first recess portion 15 may be formed by forging in a separate process after the shaft member 2 has been forged. When the thrust bearing face 11a at the non-closed side is formed at the end face 2b1 of the flange portion 2b as shown in the figure, the thrust bearing face 11a having the dynamic pressure grooves and the first recess portion 15 are formed at the same time by means such as pressing. Plastic flow of a metal structure involved in rolling of the second recess portion 15 is absorbed mainly by a boundary portion 17 between both the recess portions 15 and 16.

An approximate ratio of a width f in a radial direction of the first recess portion 15 to a radius r of the flange portion is set at a range of $0.03 \leq f/r \leq 0.20$, and that of a width g in an axial direction of the second recess portion 16 to a length h in an axial direction of the shaft member 2, at a range of $0.01 \leq g/h \leq 0.05$. Further, depths of both the recess portions 15 and 16 are set at from 0.05 to 0.4 mm (FIG. 2 exaggeratedly illustrates the sizes of both the recess portions 15 and 16).

Figure 5:
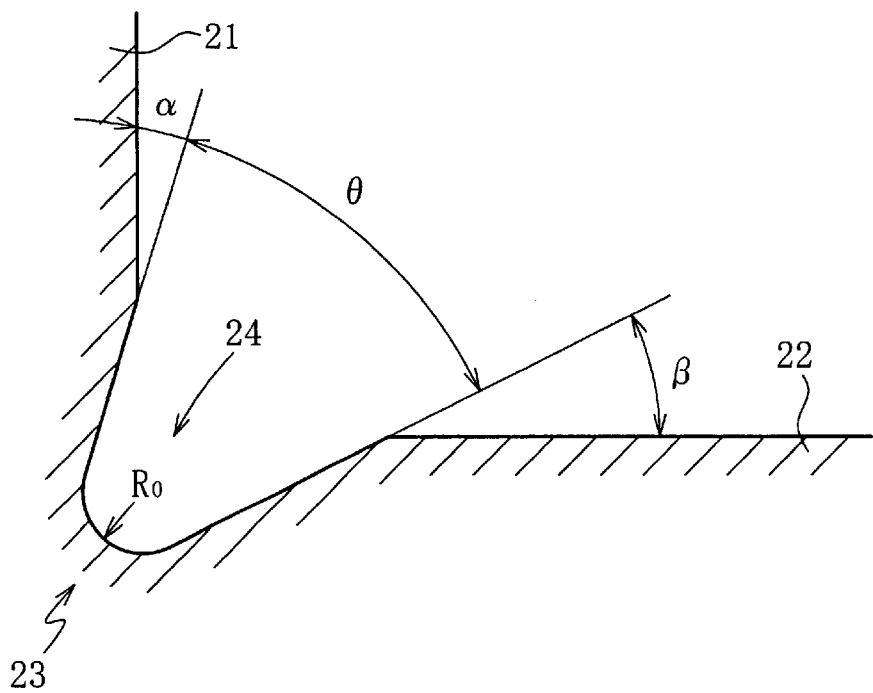
FIG. 5 is an enlarged cross sectional view of a recess portion.

The shaft member 2 is ground after the second recess portion 16 has been formed. A heat treatment such as induction quenching is applied to the ground shaft member 2 to harden it up to surface hardness of from 500 to 550 Hv With this invention, because the recess portion 14 is formed by forging and rolling as described above, working time can be considerably reduced in comparison with the case where it is formed by turning. Further, the first and second recess portions 15 and 16 are formed by plastic deformation in axial and radial directions, so that a dedicated working device such as that required for forming a recess portion 24 having an inclination shown in FIG. 5 is not required. Therefore, a conventional working device can also be used. This, in combination with the fact that the entire shaft member 2 is formed by forging, enables to greatly reduce the costs of the shaft member 2.

Figure 4:
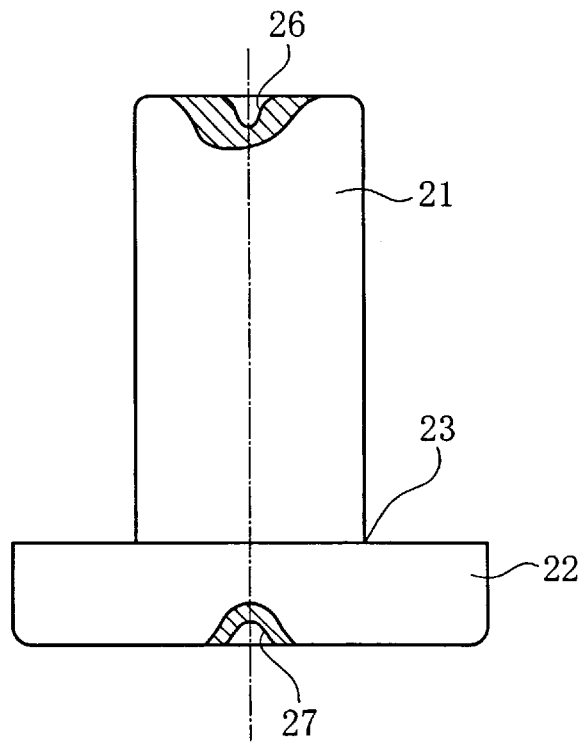
FIG. 4 is a side view, partly cross-sectioned, of a shaft member in the prior art.

When the shaft member 2 is worked by turning, center holes 26 and 27 must be formed beforehand as shown in FIG. 4. However, when the shaft member 2 is forged as described above, this kind of center hole is not required. Thus, working steps for working the shaft member 2 decrease accordingly, resulting in further reduction in costs.

Figure 3:
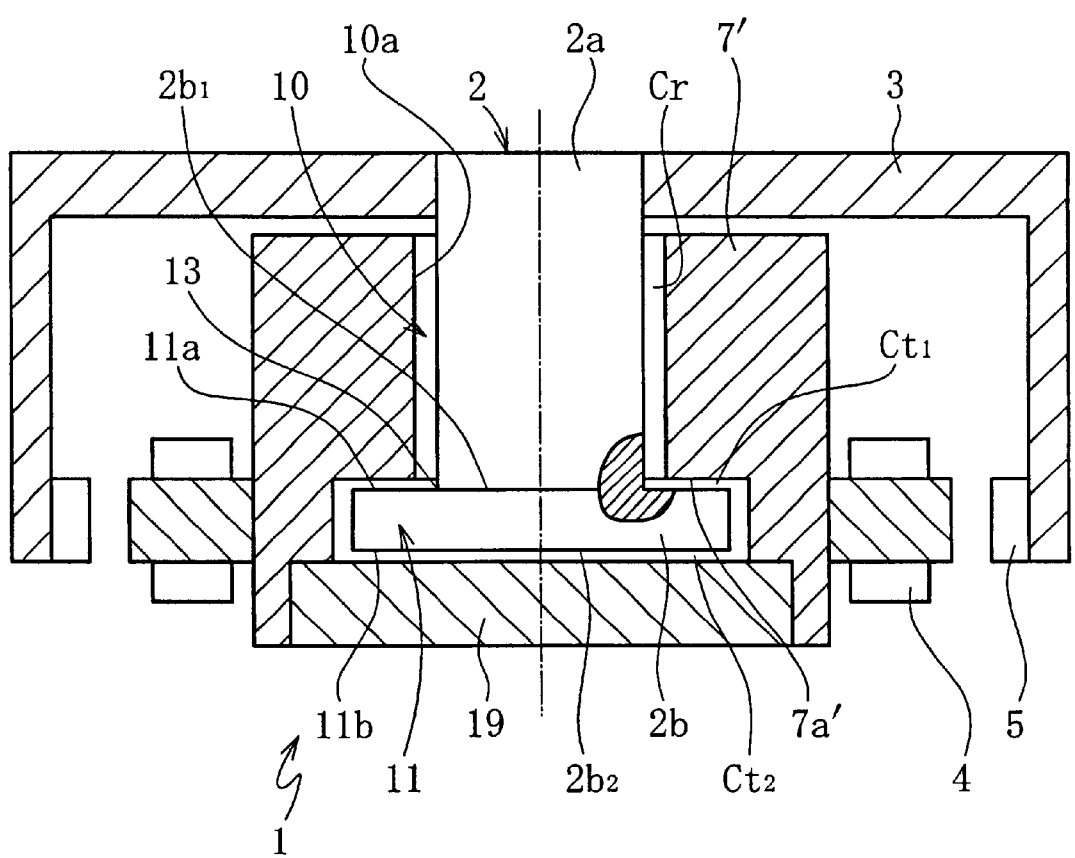
FIG. 3 is a cross sectional view showing another embodiment of the invention.

FIG. 3 shows an alternative embodiment of the invention. This bearing unit 1 is constituted in such a way that the housing 9 and the bearing member 7, shown in FIG. 1, are formed in one piece as a single unit of a bearing member 7', and bottom portion opening of the bearing member 7' is closed with a blocking member 19 which is a separate member from the bearing member 7'. Out of the thrust bearing clearances Ct1 and Ct2, the thrust bearing clearance Ct1 at the non-closed side is formed between the end face 2b1 at the non-closed side of the flange portion 2b and an end face 7a' of the bearing member 7' opposed to the end face 2b1 at the non-closed side. The thrust bearing clearance Ct2 at the closed side is formed between an end face 2b2 at the closed side of the flange portion 2b and a face opposed to the end face 2b2, or an end face of the blocking member 19.

In this case as well, similar effect as that described above is obtainable by forming the recess portion 14 as shown in FIG. 2 at a corner portion 13 between the shaft portion 2a of the shaft member 2 and the flange portion 2b. Members and parts in FIG. 3 other than those described above are the same as those shown in FIG. 1. Therefore, common reference numerals are given to the common members and parts in the figures to avoid repetition or redundancy in description.

According to the invention, highly accurate squareness can be obtained, because a shaft member is formed in one piece. Further, squareness can be measured also before assembling the shaft member into a bearing unit. Therefore, a flange portion is prevented from contacting with other members (such as a bearing member or a bottom portion of a housing) to provide steady bearing performance, so that accuracy of spindle motors for information-processing equipment such as HDDs can be further improved. Further, because the shaft member including a recess portion is formed entirely through working methods (forging and rolling) involving plastic deformation, working time can be considerably reduced when compared with the case where the formation is made by turning. Also, no special working device such as that needed for forming a recess portion with an inclined form is required. Accordingly, costs of bearing units and even those of spindle motors, in which the bearing units are assembled, for information-processing equipment can be greatly lowered.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A hydrodynamic bearing unit comprising:

a shaft member having a shaft portion and a flange portion;

a radial bearing portion supporting the shaft portion in a radial direction without contact by hydrodynamic pressure generated in a radial bearing clearance; and a thrust bearing portion supporting the flange portion in a thrust direction without contact by hydrodynamic pressure generated in a thrust bearing clearance, wherein the shaft member is formed in one piece by forging, and a recess portion formed by forging or rolling is provided at a corner portion between the shaft portion and the flange portion.

2. A hydrodynamic bearing unit comprising:

a shaft member having a shaft portion and a flange portion;

a radial bearing portion supporting the shaft portion in a radial direction without contact by hydrodynamic pressure generated in a radial bearing clearance; and a thrust bearing portion supporting without contact the flange portion in a thrust direction by hydrodynamic pressure generated in a thrust bearing clearance, wherein the shaft member is formed in one piece by forging, a first recess portion formed by plastically deforming a part of an end face of the flange portion in an axial direction of the shaft member is provided at the end face thereof near an outside periphery of the shaft portion, and a second recess portion formed by plastically deforming a part of an outside periphery of the shaft portion in a radial direction of the shaft member is provided at the outside periphery thereof near the end face of the flange portion.

3. The hydrodynamic bearing unit according to claim 2, wherein the first recess portion is formed by forging, and the second recess portion is formed by rolling.

4. A spindle motor for information-processing equipment, comprising a spindle which is rotatably supported by the hydrodynamic bearing unit according to any one of claims 1 to 3.

* * * * *